May 7, 1968     D. BLITZ ET AL     3,382,460
LINEARLY SWEPT FREQUENCY GENERATOR
Original Filed May 9, 1966     5 Sheets-Sheet 1
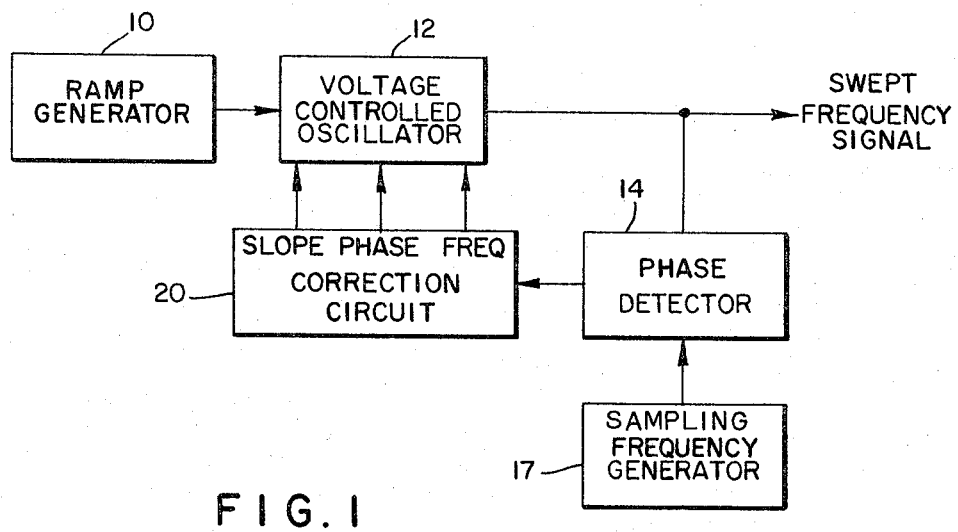
FIG. 1
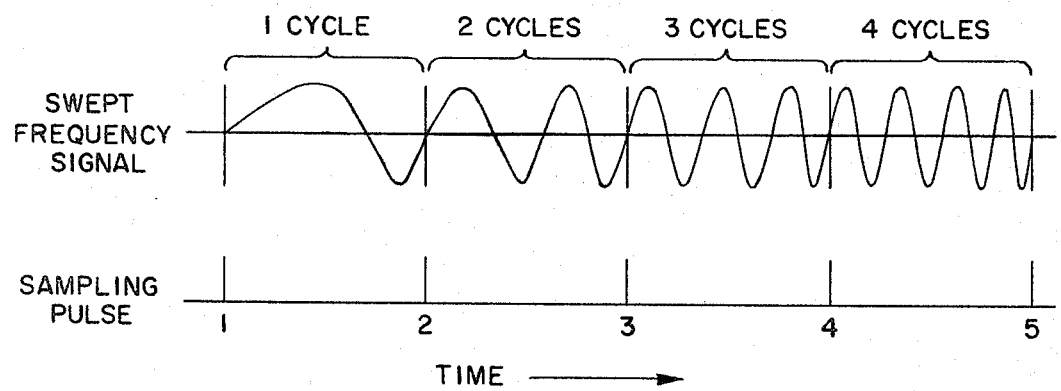
FIG. 2
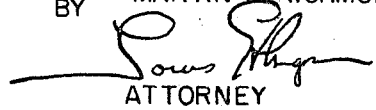
INVENTORS.
DANIEL BLITZ
MARTIN R. RICHMOND
BY
ATTORNEY

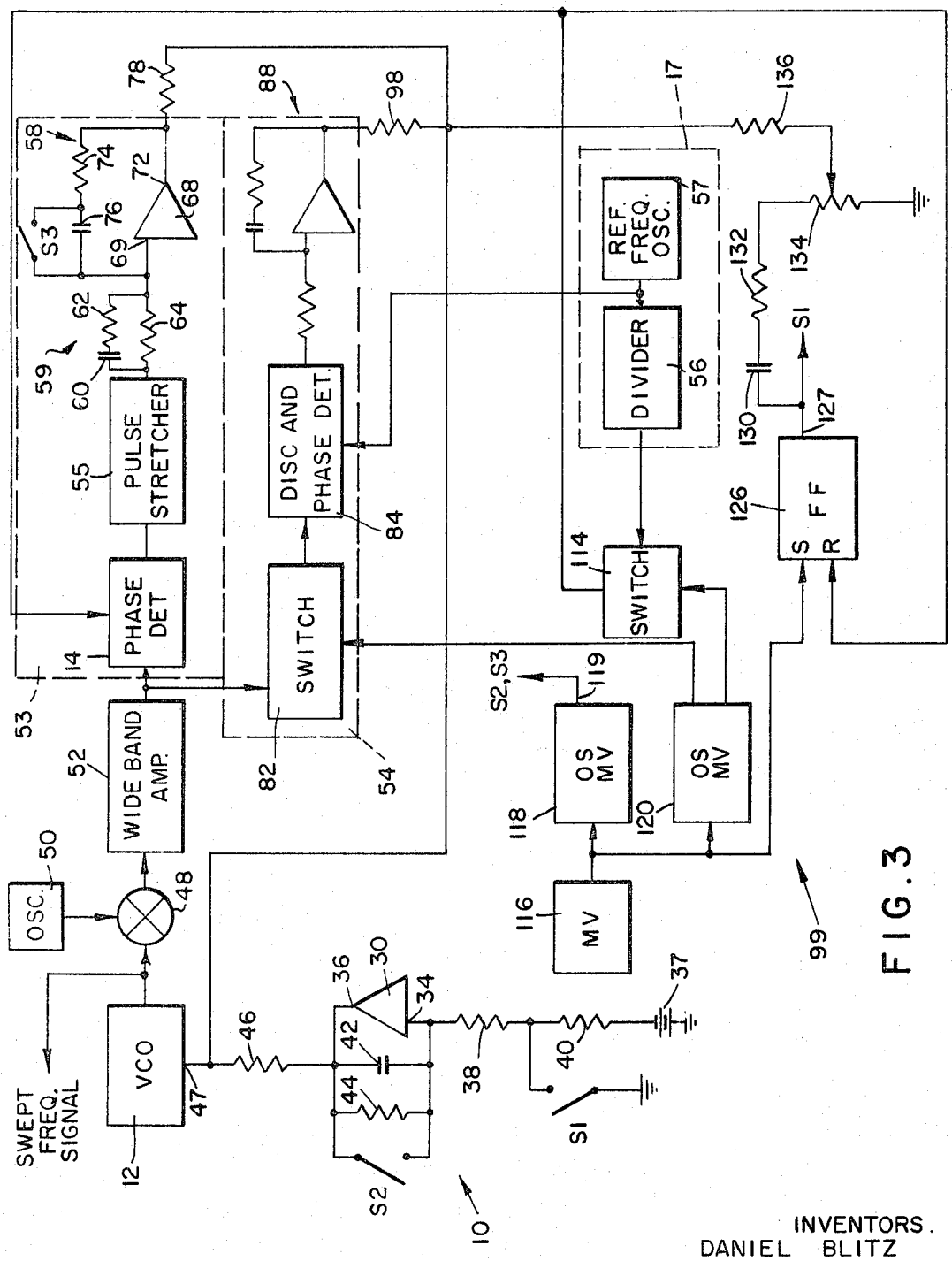

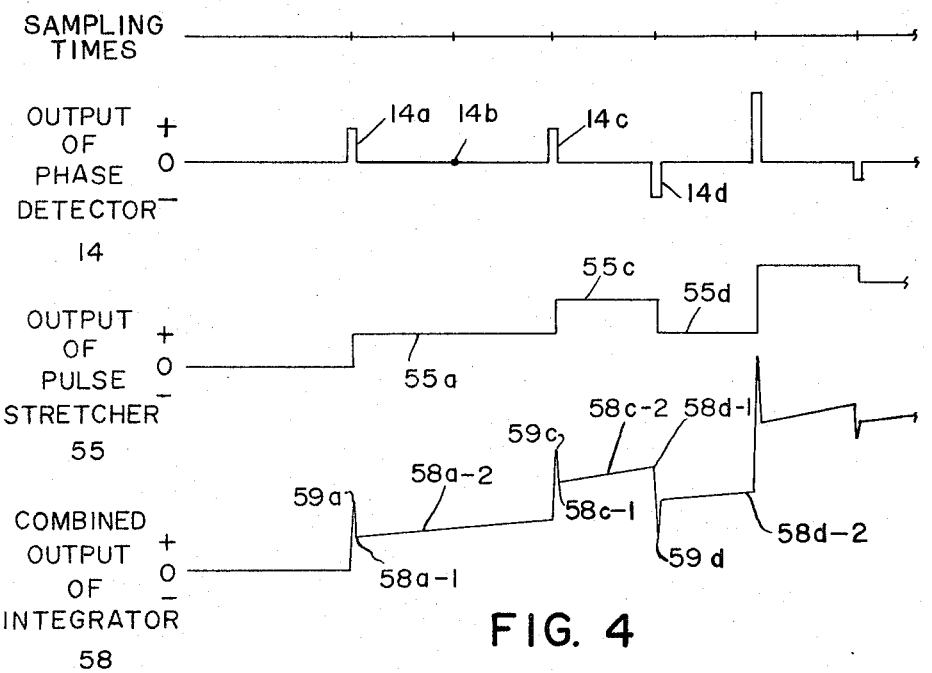
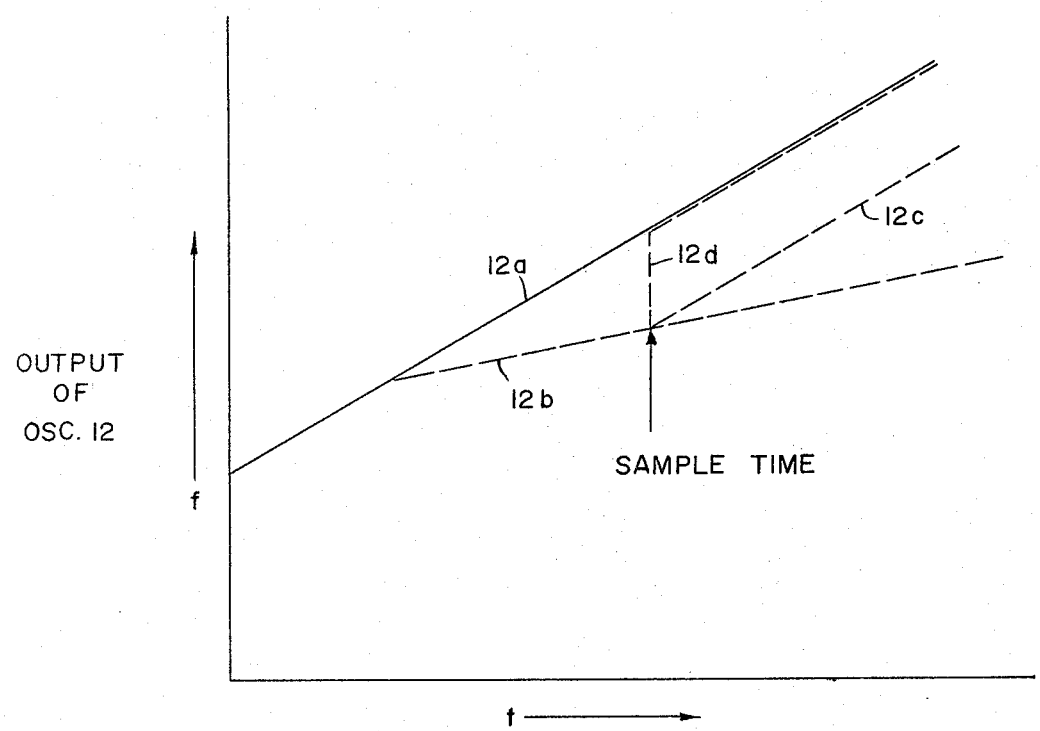

United States Patent Office 3,382,460
Patented May 7, 1968

3,382,460
LINEARLY SWEPT FREQUENCY GENERATOR
Daniel Blitz, Boston, and Martin R. Richmond, Belmont, Mass., assignors to Sanders Associates, Inc., Nashua, N.H., a corporation of Delaware
Continuation of application Ser. No. 548,564, May 9, 1966. This application Sept. 11, 1967, Ser. No. 667,334
20 Claims. (Cl. 331—178)

This invention relates to a sweep frequency generator. It relates more particularly to a generator whose output frequency changes precisely in accordance with a predetermined function of time.

The present application is a continuation of our presently pending application, also entitled, "Linearly Swept Frequency Generator," Ser. No. 548,564, filed May 9, 1966, now abandoned.

A sweep frequency generator provides an output signal which sweeps over a given frequency range at a predetermined rate. Close control of the sweep rate is often highly desirable as a means of determining the frequency at any time during the sweep. For example, a receiver arranged for surveillance of a frequency band may employ a sweep frequency generator as its local oscillator. Each received signal is timed from the beginning of the frequency sweep and the length of this interval corresponds to the frequency of the signal. Needless to say, the accuracy of this method of frequency measurement depends on the accuracy with which the output of the sweep generator corresponds to its predetermined time relationship.

As a general rule, once the generator commences its sweep, no provision is made for detecting and correcting deviations from the desired generator output signal. As a practical matter, these errors from the proper sweep can become quite large, particularly if the generator is sweeping over a wide frequency range and uses an electronic frequency sweep mechanism for high speed operation.

In one instance of which we are aware, an attempt is made to control the generator output during the course of the sweep by measuring the time to reach specific frequency check-points in the sweep. This information is fed back to the generator so that if these times vary one way or the other from the known proper value, an error signal is applied to the generator to return the output signal to the proper frequency in the sweep. Even with this frequency "spotting" mode of sweep control, the accuracy is not improved enough, particularly if a wide frequency range is involved. Moreover, the circuitry required for such frequency "spotting" is quite complex and critical to adjust.

It is the principal object of this invention to provide a sweep frequency generator whose output frequency can be precisely controlled in a predetermined way over a wide frequency range.

Another object of this invention is to provide a sweep frequency generator capable of producing a linearly swept frequency signal having accurately controlled slope.

A still further object of this invention is to provide a controlled sweep frequency generator which is accurate yet which employs relatively simple circuitry that is both stable and easy to adjust.

Other objects of the invention will in part be obvious and will in part appear hereinafter.

The invention accordingly comprises the features of construction, combination of elements, and arrangement of parts which will be exemplified in the construction hereinafter set forth and the scope of the invention will be indicated in the claims.

For a fuller understanding of the nature and objects of the invention, reference should be had to the following detailed description taken in connection with the accompanying drawings in which:

FIG. 1 is a block diagram of a controlled sweep frequency generator embodying the principles of this invention;

FIG. 2 is a graphical representation of the output of the generator illustrated in FIG. 1;

FIG. 3 is a block diagram, partly in schematic form, of a linear sweep frequency generator incorporating the invention;

FIG. 4 is a graphical representation of the outputs of various elements of the circuit FIG. 3;

FIG. 5 is a graph showing corrections made to the output of the generator;

Figure 6:
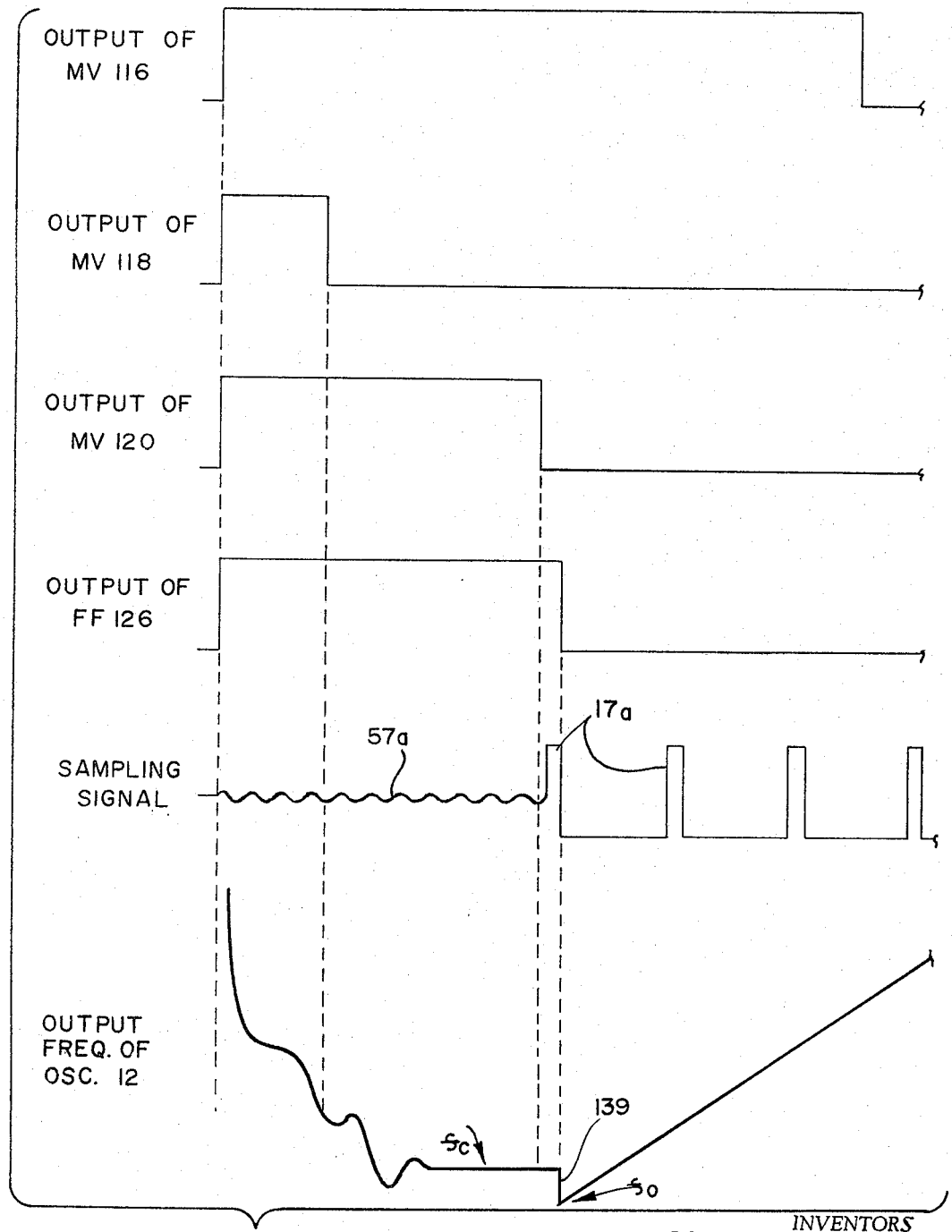
FIG. 6 is a graphical representation of the outputs of various elements of the circuit illustrated in FIG. 3.

Briefly, our frequency generator employs a voltage controlled oscillator which produces an output whose frequency sweeps through a given frequency range. The control voltage is varied so as to vary the frequency of the output signal as a predetermined function of time over the range. The phase of the output signal is sampled at intervals as determined by a sampling signal.

The sampling intervals are so chosen that the phase of the output signal changes by predetermined increments between successive samplings. Generally, the intervals are selected so that the output signal contains only integral numbers of cycles between successive samplings if its frequency varies at the prescribed rate. In other words, the signal waveform gains (or loses) an integral number of cycles with each subsequent sample. Thus, the sampled phases will all be identical if the generator output frequency changes at the correct rate. Any variation in the sampled phase from the norm is detected and fed back as an error signal to the voltage controlled oscillator to correct the slope, phase and frequency of its output signal. In this sense, it is similar to a conventional phase lock circuit.

Although the invention has general application to sweep frequency generators producing output frequencies having many different functions of time, it is particularly suitable for achieving a controlled linear frequency sweep. In this case, the waveform gains (or loses) cycles at a constant rate. Therefore, a constant sampling frequency can be used to check the phase of the continuously varying generator output frequency. For simplicity, the system is arranged to sample the output signal at zero axis crossings. As long as the average value of the signal during the brief sampling interval is zero, no error signal will be fed back to the oscillator. However, if the signal has a leading or lagging phase, this will produce a finite average voltage which is used as an error signal to correct the output signal.

Referring now to FIG. 1, in its simplest form, a linear sweep frequency generator embodying the invention comprises a ramp generator 10 whose output is fed to a voltage controlled oscillator 12. The linearly changing output voltage from the ramp generator 10 causes the oscillator 12 to sweep its frequency approximately linearly with respect to time in the usual way. The output of the oscillator 12, which is also the output of the frequency generator as a whole, is fed to a phase detector 14.

The phase detector 14 is turned on periodically by a signal from a sampling frequency pulse generator 17.

Each time the phase detection 14 is pulsed on, it delivers an error signal which is indicative of the instantaneous phase of the oscillator 12 at that moment. This error signal is fed to a correction circuit 20 and there is processed to produce slope, phase and frequency correction signal components for the controlled oscillator 12.

Preferably, the correction signal components fed back to the voltage controlled oscillator 12 simultaneously correct the slope error of the frequency sweep and also reset the phase and frequency to where they would have been if the frequency slope had been correct.

The selection of the correct sampling rate in relation to the frequency sweep is all-important to proper operation of the system. Preferably, the frequency of the sampling frequency generator 17 (i.e. the rate at which the phase detector 14 samples) is arranged so that the output of the voltage controlled oscillator 12 contains an integral number of cycles in the interval between each sampling pulse and the next. Therefore, if the frequency sweep is correct, the sweep signal has the very same phase each time it is sampled, even though its frequency changes between samples. While sampling at any phase angle is feasible, it is most convenient to sample the swept frequency signal at a zero axis crossing when its amplitude is zero, for then the sampled phase, if correct, will be reflected by a zero output from phase detector 14.

In the case of a linear sweep frequency generator, the sampling intervals can be uniform and consequently can be controlled by a sampling frequency generator 17 having a constant output frequency, i.e. a clock. The sampling rate is then determined in the following way.

With a linear sweep, the frequency of the output signal from the voltage controlled oscillator 12 may be expressed by the following relationship:

$$f = f_4 + \delta t \quad (1)$$

where $f$ is the frequency (cycles/second);
$f_0$ is the initial frequency of the sweep (at $t=0$);
$\delta$ is the rate of change of frequency (cycles/second$^2$); and
$t$ is the time from start of sweep (seconds).

The phase of the signal is given by:

$$\theta = \int f \, dt = \theta + f_4 t + \tfrac{1}{2} \delta t^2 \quad (2)$$

where $\theta$ is the phase in cycles; and
$\theta_4$ is the phase at $t=0$.

If the signal phase is sampled at uniform time increments, then:

$$t = n(\Delta t) \quad (3)$$
$$= n/f_s$$

where $n$ is the sample number at time $t$ (e.g. $n=0$); occurs at $t=0$);
$\Delta t$ is the time increment between samplings; and
$f_s$ is the sampling frequency $= 1/\Delta t$.

Therefore, the phase of the "$n$th" sample is $$\theta = \theta + \frac{f_0 n}{f_s} = \frac{\delta n^2}{2 f_s^2} \quad (4)$$

It follows, then, that the phase change $\Delta \theta$ between successive samples is given by $$\Delta \theta = \theta_n - \theta_{n-1} = \frac{\delta n}{f_s^2} + \frac{f_0}{f_s} - \frac{\delta}{2 f_s^2} \quad (5)$$

Letting $$k = \delta/f_s^2 \quad (6)$$

and $$c = \frac{f_0}{f_s} - \frac{\delta}{2 f_s^2} = \frac{f_0}{f_s} - \frac{k}{2} \quad (7)$$

then $$\Delta \theta = kn + c \quad (8)$$

where $k$ is the number of additional cycles to be added between successive samplings; and
$c$ is the initial number of cycles between samplings.

Solving Equations 6 and 7 for the sampling frequency $f_s$ and the initial frequency of the sweep $f_0$, it is seen that $$f_s = (\delta/k)^{1/2} \quad (9)$$

and $$f_0 = f_s \left( c + \frac{k}{2} \right) \quad (10)$$

Also, since the phase angle is preferably an integral multiple of a cycle between samples, as noted above, it follows from Equation 8 that $k$ and $c$ should both be integers.

In the case of a linear sweep, in which the output signal from oscillator 12 adds one additional cycle between successive samplings, $k=1$. In this case, from Equations 9 and 10, it is seen that:

$$f_s = \delta^{1/2} \quad (11)$$

$$f_0 = f_s(c + \tfrac{1}{2}) \quad (12)$$

FIG. 2 illustrates graphically the relationship which obtains between the frequency sweep of the oscillator 12 and the output of the sampling frequency generator for the above example. The sampling pulses derived by generator 17 occur at uniformly spaced intervals. However, the signal from the oscillator 12 is continuously increasing in frequency between samples. Nevertheless, each sweep interval between samples contains an integral number of cycles, there being one additional cycle between successive samples. Moreover, the phase of the sweep signal at the time of sampling is always the same, to wit: zero degrees in this example.

If it is desired to sample every half cycle, it is apparent from FIG. 2 that the phase of the sampled signal will change by one-half cycle with each successive sample with a corresponding alternation in the polarity of the output of the phase detector 14. This phase reversal between successive samplings can be countered by continually reversing the polarity of the input or output signal of the phase detector. However, this complicates the circuitry. Therefore, to avoid this problem, it is desirable, as noted above, to have an integral number of cycles between samples (i.e. make both $k$ and $c$ integers).

In the case of the linear sweep, polarity reversal between samples can be avoided also by increasing the interval between samplings, i.e. make $k=2$. From Equation 9, $$f_s = (\delta/2)^{1/2} \quad (13)$$

Now, however, the sampling frequency ($f_s$) is only the square root of one-half as great as before, resulting in a possible sacrifice in the tightness of the feedback control of the voltage controlled oscillator 12.

It may be desirable to start the frequency sweep at zero frequency and increase the interval between samplings by one cycle (i.e. maintain $k=1$). In this event, from Equations 9 and 10

$$f_0 = 0 \quad (14)$$

and $$c = -\frac{k}{2} = -\tfrac{1}{2} \text{ cycle} \quad (15)$$

From Equation 15, it is seen that the phase of the sampled signal will change by one-half cycle with each successive sample, with a corresponding alternation in the polarity of the output of the phase detector 14. This phase reversal can be countered by reversal polarity as described above.

It should also be understood that sweeps other than linear ones can be controlled using the technique described herein. For example, the swept frequency signal from oscillator 12 may vary as the square of time, i.e.:

$$f = \delta t^2 + f_0 \quad (16)$$

By following the same type of derivation as before, it is found that $$\Delta \theta = p(n^2 - n) + q \quad (17)$$

where $p$ is a constant factor of additional cycles to be added between successive samplings, and
$q$ is the initial number of cycles between samplings.

In this case, the sampling frequency $f_s$ and the initial frequency $f_0$ of the swept signal are given by $$f_s = (\delta/p)^{1/2} \quad (18)$$

$$f_0 = f_s\left(q - \frac{p}{3}\right) \quad (19)$$

In the general case, where the swept frequency signal varies as power $x$ of time, i.e.

$$f = \delta t^x + f_0 \quad (20)$$

then $$\Delta\theta = \frac{\delta}{f_s^{x+1}}\left[n^x - \frac{xn^{x-1}}{2!} + \frac{x(x-1)n^{x-2}}{3!} - \ldots\right] - \frac{\delta(-1)^{x+1}}{(x+1)f_s^{x+1}} + \frac{f_0}{f_s} \quad (21)$$

Letting $$p = \delta/f_s^{x+1} \quad (22)$$

and $$q = \frac{f_0}{f_s} - \frac{\delta(-1)^{x+1}}{(x+1)f_s^{x+1}} \quad (23)$$

then $$\Delta\delta = pf(n) + q \quad (24)$$

where $$f(n) = \left[n^x - \frac{xn^{x-1}}{2!} + \frac{x(x-1)n^{x-2}}{3!} - \ldots\right]$$

Also, the sampling frequency $f_s$ and initial frequency $f_0$ are given by $$f_s = \left(\frac{\delta}{p}\right)^{\frac{1}{x+1}} \quad (25)$$

and $$f_0 = f_s = \left[q + \frac{(-1)^{x+1}p}{x+1}\right] \quad (26)$$

Sampling should occur when $f(n)$ in Equation 21 is an integer. It should be emphasized at this point that $f_s$ is not a function of time, but is constant, as seen from Equation 25.

Thus, it is a very significant aspect of this invention that despite the nonlinearity of the desired frequency sweep, the sampling frequency ($f_s$) at which the swept signal is ultimately controlled can be constant with time and therefore can be generated by a simple fixed frequency clock.

Other complex sweeps can be controlled by programming the sampling frequency to change at the appropriate rate to leave an integral number of cycles of the swept signal between each sample. For example, two of the described controlled sweep frequency generators may be connected in cascade so that the swept output signal from the first determines the rate of sampling in the second generator.

Refer now to FIG. 3 which illustrates in greater detail a controlled sweep frequency generator having a linearly swept output. The generator is basically the same as that illustrated in FIG. 1. Preferably the initial frequency, prior to the beginning of the sweep, is accurately controlled by means of a phase locking arrangement using a multiple of the frequency of the sampling frequency generator 17 as a reference.

As shown in FIG. 3, the ramp generator 10 may be an integrator employing an operational amplifier 30 having input and output terminals 34 and 36, respectively. Terminal 34 is connected through a pair of series resistors 38 and 40 to a voltage source illustrated by a battery 37.

The output of amplifier 30 is fed back to input terminal 34 via a capacitor 42. A resistor 44 included in the feedback network in parallel with capacitor 42 causes the ramp generator 10 to integrate slightly nonlinearly to compensate for nonlinearity in the voltage controlled oscillator 12.

A switch S1, connected to short circuit the input voltage from the battery 37, and a switch S2, connected to discharge the feedback capacitor 42, are closed to reset the ramp generator 10 and then opened to initiate generation of its output signal. This signal, which is a voltage increasing approximately linearly with time, is fed via a series resistor 46 to the control terminal 47 of the oscillator 12.

The output of the oscillator 12 is also fed to a mixer 48 where it is mixed with the output of a crystal controlled oscillator 50. The low frequency output of the mixer 48 is then passed via a conventional wide band amplifier 52 to a frequency sweep control circuit indicated generally at 53, which ultimately controls the frequency of oscillator 12 during the actual sweep or ramp period. The amplified signal from mixer 48 is also fed to a constant frequency control circuit indicated generally at 54 which phase locks the output signal from oscillator 12 to the system reference frequency prior to the start of the frequency sweep. It should be mentioned at this point that the frequency control circuits 53 and 54 actually sample and synchronize the output of the mixer 48 rather than the output of oscillator 12. They could, however, sample the oscillator 12 output directly. Accordingly, the mixer 48 and fixed frequency oscillator 50 are to be treated herein as part of the voltage controlled oscillator 12.

The frequency sweep control circuit includes the phase detector 14, which receives the output of amplifier 52 and compares its phase with that of the output of a frequency divider 56 in the sampling frequency generator 17. The output frequency of the divider 56 is preferably in the form of pulses occurring at a submultiple of the frequency of a reference frequency oscillator 57 used as a phase reference in the constant frequency control circuit 54. Detector 14 is switched on periodically at the sampling rate and, as noted above, its output reflects the phase error in the signal from oscillator 12 at the time of sampling. This error signal, which has the form of a series of brief pulses, is fed to a modified pulse stretcher 55.

The output from the pulse stretcher 55 is a continuous voltage whose level increases or decreases in correspondence with successive error pulses from phase detector 14. A positive pulse causes the level to become more positive, while a negative pulse causes it to change in the negative direction. If there is no phase error in the output of the oscillator 12, the output of the pulse stretcher 55 remains unchanged. These relationships are illustrated in FIG. 4.

The signal from pulse stretcher 55 is processed three ways. First, it is used directly as a frequency correction. Second, it is integrated by a modified integrating network indicated generally at 58 to obtain a slope correction. Finally, it is differentiated by the network indicated generally at 59 to establish a phase correction. Alternatively, the pulses from the phase detector 14 might be used directly for phase correction. All of these correction signal components are fed back to the input of the voltage controlled oscillator 12 so that ideally during each sample, they correct the sweep slope error and reset the phase and frequency to where they would have been if there had been no slope error.

FIG. 5 illustrates the reason for correcting all three characteristics of the oscillator signal. Ideally, the frequency of the oscillator 12 is to change linearly with time in accordance with the curve 12a. However, it may depart from the desired slope and follow the curve 12b (exaggerated slope). This results in a departure from the phase synchronism illustrated in FIG. 2 and the phase detector 14 (FIG. 3) emits a corresponding error signal at the time of the next sampling. A slope correction signal from the modified integrator 58 returning the oscillator 12 to the correct slope will then provide operation along a curve 12c. However, there will then be a frequency error in the oscillator signal corresponding to the vertical distance between the curves 12a and 12c. A frequency correction derived from the error signal will jump the frequency of the oscillator by the amount of this frequency error, as indicated at 12d, so as to return the oscillator signal to the curve 12a.

The oscillator output signal will now be in synchronism with the sampling frequency signal. However, as a result of the phase change occasioned by the departure along the curve 12b, the axis crossings of the sweep signal will no longer occur at the time of future samplings. Rather, the successive samplings will "see" some other points in the oscillator waveform. Accordingly, the phase detector 14 will indicate an error even though the oscillator frequency now has the desired value. The phase correction derived from the original error signal by means of the differentiating network 59 has the form of a pulse which momentarily shifts the frequency of the oscillator 12 so as to change the phase of its output signal and give it the value it would have had if the signal had originally continued along the curve 12a. That is, with the phase correction signal, the desired zero axis crossing again occurs at the sampling time. Consequently, immediately after detection of a sampling error, not only is the slope error corrected, but also the sweep frequency is reset to the frequency and phase it would have had if there had been no slope error initially.

It should be noted that oscillator correction satisfactory for many applications can be obtained solely from slope correction or frequency correction. However, the speed of correction and accuracy of control are optimized by using all three types of correction. Moreover, if slope correction is to be used, frequency and phase correction are available with only a very slight increase in the number of circuit components.

The differentiating network 59 comprises a capacitor 60 and resistor 62 conected in series between pulse stretcher 55 and network 58. A second resistor 64 is connected in parallel across the resistor-capacitor combination to pass the steady-state components of the signals from the pulse stretcher. The integrating network 58 comprises simply a conventional operational amplifier 68 with an input terminal 69 conected to network 59. The amplifier output terminal 72 is connected via a series resistor 78 to the control terminal 47 of the voltage controlled oscillator 12. A resistor 74 and capacitor 76 constitute a feedback network between output terminal 72 and input terminal 69. A switch S3 is connected across capacitor 76 to discharge the capacitor 76 upon completion of each frequency sweep.

At the beginning of each frequency sweep, the voltage across the capacitor 76 is zero, and preferably the output voltage of the pulse stretcher 55 and the integrator 48 are also zero. Next, assume as in FIG. 4 that the phase detector 14 emits an error-indicating pulse 14a followed by a corresponding output level 55a from the pulse stretcher. This results in a signal at the output of the integrator 58 containing components for all three of the desired oscillator corrections.

More specifically, the increase in pulse stretcher output voltage to the level 55a (FIG. 4) results in a phase-correcting pulse 59a from the differentiating circuit 59. This pulse is passed through to the output terminal of the integrator 58 by way of the feedback network in the integrator. To this end it is desirable that the feedback network have a substantially greater time constant than the differentiating circuit 59, by virtue of a relatively large capacitance in the capacitor 76.

At the same time, the characteristics of the amplifier 68 and the negative feedback by way of the resistor 74 and capacitor 76 provide a current in the feedback network proportional to the output voltage of the pulse stretcher 55. The resulting voltage drop across the resistor 74 results in an immediate frequency-correcting output voltage from the integrator as indicated at 53a–1 in FIG. 4. Moreover, the constant feedback current occasioned by the constant output voltage of the pulse stretcher charges the capacitor 76 linearly with time so that the output voltage of the integrator has a correspondingly linear increase. This component, illustrated at 58a–2 in FIG. 4, is the slope correction signal for the oscillator 12.

As indicated in FIG. 4, the correction signal components 59a, 58a–1 and 58a–2 alter the output signal of the oscillator 12 sufficiently to keep the output of the mixer 48 in synchronism with the reference signal through the next sampling period 14b. Thus, there is no output from the phase detector 14 at this time and the frequency and slope correction components 58a–1 and 58a–2 continue unchanged.

Another error signal 14c appears during the succeeding sampling interval, however, with a resultant change in pulse stretcher output to the level 55c. In the manner described above, this results in a phase correcting pulse 59c, an additional frequency correcting component 58c–1 and a change in the slope correcting component as indicated at 58c–2.

During the next sampling interval, an error signal 14d, of the same magnitude but opposite polarity to the signal 14c, restores the output of the pulse stretcher 55 to its previous level as indicated at 55d. This results in a phase correcting pulse 59d together with corresponding changes in the frequency and slope-correcting components as indicated at 58d–1 and 58d–2.

With reference to FIG. 3, as mentioned previously the sweep frequency generator also includes the constant frequency control circuit 54 which synchronizes the initial frequency of the oscillator 12 to the output of the reference frequency oscillator 57 in a conventional phase lock arrangement, prior to the start of the frequency sweep. Control circuit 54 comprises a switch 82 which passes the output of amplifier 52 to a combination discriminator and phase detector 84.

The discriminator and phase detector 84 receives a sampling frequency from the reference oscillator 57 and provides an error signal indicative of the difference in frequency and phase between the outputs of the amplifier 52 and oscillator 57. The error signal, in turn, is integrated by an integrator 88 and the output of the integrator is applied to the oscillator 12 control terminal 47 by way of a resistor 98 to close the control loop.

The resistors 46, 78 and 98 combine with the input resistance of the oscillator 12 to form a summing network which sums the output voltages of the ramp generator 10 and the integrators 58 and 88.

Still referring to FIG. 3, a timing network indicated generally at 99 controls the commencement and termination of the frequency sweep of the voltage controlled oscillator 12. FIG. 6 shows the timing sequence involving the network 99 and reference to this figure during the following discussion will facilitate an understanding of the operation of the network. The network 99 comprises a multivibrator 116 which initiates operation by generating a square pulse whose leading edge simultaneously triggers a pair of one shot multivibrators 118 and 120 and sets a flip-flop 126. The flip-flop thus closes the switch S1 to interrupt the input voltage for the ramp generator 10. In its unstable state the multivibrator 118 provides a voltage at its output terminal 119 to close the switches S2 and S3 in the ramp generator 10 and integrator 58. This resets both devices by discharging the capacitors 42 and 76. As seen in FIG. 6, it remains in its unstable state for only a short time.

The one shot multivibrator 120 controls the switching between the frequency sweep and constant frequency control modes. On being triggered by the multivibrator 116, it opens switch 114 and closes switch 82. This stops the operation of frequency sweep control circuit 53 by disconnecting the phase detector 14 from sampling frequency generator 17, and enables operation of the constant frequency control circuit 54 in the manner described above with the discriminator and phase detector 84 receiving signals 57a from amplifier 52 as well as directly from the reference oscillator 57.

The multivibrator 120 preferably has a somewhat slower return time than the multivibrator 118. When it returns to its stable state, it opens the switch 82, thereby disabling the constant frequency control circuit 54. At the same time, it closes switch 114 to initiate the frequency sweep and also enable operation of the frequency sweep control circuit 53.

Specifically, the switch 114 now passes the sampling frequency signal 17a from the sampling generator 17 to the phase detector 14. This signal is also coupled via switch 114 to the reset input of flip-flop 126. As seen in FIG. 6, the first such signal 17a after the return of multivibrator 120 resets flip-flop 126. This, in turn, opens the switch S1 to initiate ramp generation by the ramp generator 10.

Accordingly, at this point, the ramp generator 10 and frequency sweep control circuit 53 have been reset. The constant frequency control circuit 54, having synchronized the initial frequency $f_0$ of the sweep to the frequency $f_c$ of oscillator 57, as seen from the lowermost curve in FIG. 6, is disabled, but it nevertheless holds its frequency-correcting signal. Finally, the lower rate ($f_s$) sampling pulses from generator 17 are now being fed to phase detector 14. The frequency sweep begins with the first such pulse 17a.

The output terminal 127 of flip-flop 126 is also connected via a capacitor 130, a resistor 132, a potentiometer 134 and a summing resistor 136 to control terminal 47 of the oscillator 12. The resistor-capacitor combination forms a differentiating network which passes a pulse to the oscillator 12 upon the resetting of flip-flop 126 at the beginning of the frequency sweep. The pulse causes a step or offset 139 (FIG. 6) in the initial frequency $f_0$ of the oscillator from the value corresponding to the frequency $f_c$ of the oscillator 57. The reason for this offset 139 is discussed below.

The frequency sweep continues until the leading edge of the next pulse from multivibrator 116 is applied to the multivibrators 118 and 120 and flip-flop 126. This returns the oscillator 12 to its initial frequency and switches the control system to the constant frequency mode to prepare for another frequency sweep as described above.

As mentioned previously, it is desirable to have an integral number of cycles between samples during the frequency sweep. Also, switching back and forth between the constant frequency and frequency sweep modes as described above make it desirable to use reference signals during the two modes which are synchronized to each other. The simplest way to accomplish this is by using the frequency divider 56 (FIG 3). As a result, the sampling rate $f_s$ during the sweep is an integral submultiple of the frequency $f_c$ of the reference oscillator 57 so that the same generator can be used to control frequency during both the frequency sweep and constant frequency portions of the operating cycle.

As noted above, the first of these conditions is satisfied when $k$ and $c$ are both integers. The second condition may be expressed as $$f_c = mf_s \tag{27}$$

where $m$ is an integer.

By substituting Equation 27 into Equation 10, $$f_c = \frac{mf_0}{c + \frac{k}{2}} \tag{28}$$

Therefore, in order to make $f_0$, the initial frequency of the sweep, equal to $f_c$, the reference frequency to which the oscillator 12 is set during the constant frequency mode, $$c + \frac{k}{2}$$

must equal the integer $m$. Since $k$ and $c$ are both integers, it is apparent that $f_0$ cannot equal $f_c$ unless $k$ is an even number. However, as noted previously, increasing the number of cycles between samples, i.e. making $k > 1$, makes for less control over the frequency sweep.

The generator illustrated in FIG. 3 ties the initial frequency of the sweep to the frequency of oscillator 57, while still maintaining the highest practical sampling rate (i.e. with $k = 1$) by introducing the frequency offset 139 (FIG. 6) at the beginning of the sweep. Specifically, with $k = 1$, Equation 10 may be rewritten as $$f_0 = f_s(c + \tfrac{1}{2}) \tag{10a}$$

From (10a) $f_0$ is obviously not an integral multiple of $f_s$ and therefore $f_0$ cannot equal $f_c$, given the foregoing conditions.

However, if $$f_c + f_0 + \frac{f_s}{2} \tag{29}$$

$$= f_s(c+1) \tag{30}$$

then $f_c$ will be an integral multiple of $f_s$. This is accomplished by means of the offset 139, which reduces the frequency of the oscillator 12 by $f_s/2$ so that $$f_0 = f_c - \frac{f_s}{2} \tag{29a}$$

a condition indentical with Equation 29.

The heterodyne arrangement involving the mixer 48 and oscillator 50 is very useful in this connection. The quantities $f_0$ (at the output of the mixer 48) and $f_s$ can be selected with the foregoing constraints in mind and the desired frequencies of the oscillator 12 can then be obtained merely by selecting the corresponding frequency for the oscillator 50. That is, with the FIG. 3 circuit, changing the frequency of oscillator 50 up or down will move the sweep frequency range up or down correspondingly. It should be emphasized that the frequency $f_0$ of the signal from mixer 48, which is synchronized and sampled as described above, remains the same. That is, the control circuits 53 and 54 will in any case force the output frequency of the mixer 48 to conform to the outputs of the pulse generator 17 and oscillator 57 in the manner described.

While we have specifically shown a heterodyne arrangement which beats down the oscillator 12 frequency, the oscillator can also operate at low frequencies. Then, however, sampling would normally occur at widely spaced time intervals. To avoid this, the system can then beat that frequency up and sample the higher frequency so that the sampling rate will be high enough to maintain tight control over the output frequency.

In another variation of the system, the output of oscillator 12 may be sampled directly and the output of the generator as a whole taken from the mixer 48.

Figure 7:
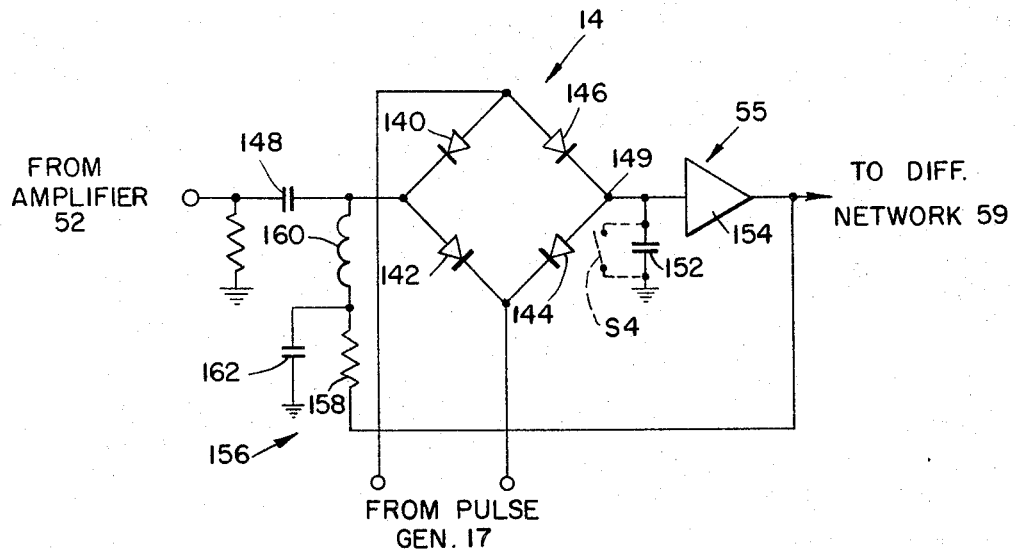
FIG. 7 is a more detailed schematic diagram of a portion of the circuit of FIG. 3.

Refer now to FIG. 7, which shows in greater detail the phase detector 14 and pulse stretcher 55 employed in the sweep frequency generator illustrated in FIG. 3. The phase detector 14 comprises four diodes 140, 142, 144 and 146 connected together to form a conventional diode bridge switch. The A.C. signal from amplifier 52 is coupled via a capacitor 148 to the junction of diodes 140 and 142. Sampling pulses from the pulse generator 17 are applied between the junction of diodes 140 and 146 and the junction of diodes 142 and 144. Each such pulse switches on the diode bridge switch momentarily so that the signal from the amplifier 52 appears at the junction 149 of diodes 144 and 146 which constitutes the output terminal of the phase detector 14. If the fequency sweep is correct, the zero axis crossings of the signal from amplifier 52 coincide with the sampling pulses from generator 17, and the voltage at the output terminal 149 of the phase detector is zero. If, however, there is an error in the frequency sweep, each time the detector 14 is switched on, an appropriate error voltage appears at the terminal 149.

The output terminal 149 of the phase detector 14 is connected to pulse stretcher 55 which comprises a capacitor 152 connected between terminal 149 and ground. An error pulse from phase detector 14 appears as a voltage level across capacitor 152 (as shown in FIG. 4). The signal on the capacitor is then simplified by an amplifier 154 and coupled to the differentiating network 59. The pulse stretcher 55 also includes a feedback network indicated generally at 156 which feeds the output of pulse stretcher 55 to the junction of diodes 140 and 142. This network comprises a resistor 158, a series connected choke 160 and a capacitor 162 connected between ground and the junction of the resistor and choke. The resistor 158 and the output resistance of amplifier 52 (FIG. 3) form a summing network which sums the outputs of the amplifier and pulse stretcher. Therefore, the signal impressed on capacitor 152 during a given pulse from generator 17 comprises the signal on the capacitor at end of the previous pulse plus any additional error voltage due to the incoming signal from amplifier 52. In this way, the pulse stretcher 55 holds its error voltage from one sampling to the next producing the continuous stepped D.C. error signal, described above, throughout the frequency sweep. The feedback network 156 provides a delay in feedback to prevent summing of the feedback signal produced during a given pulse from generator 17 until the arrival of the succeeding pulse from generator 17.

While it is not necessary to the invention, in certain cases it may be desirable to remove the error voltage from capacitor 152 at the end of each frequency sweep to prevent the integrating network 58 (FIG. 3) from developing a slope signal right at the very beginning of the next frequency sweep. This may be accomplished conveniently by connecting a switch S4 (shown in dotted lines) in parallel with the capacitor 152. The switch S4 may then be controlled by multivibrator 120 (FIG. 3).

Figure 8:
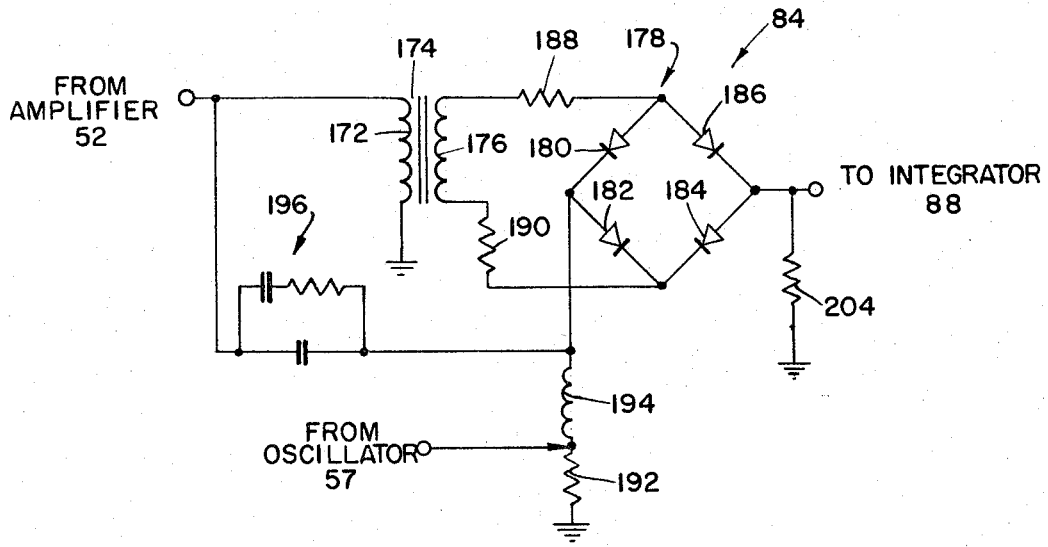
FIG. 8 is a similar detailed schematic diagram of another portion of the circuit FIG. 3.

FIG. 8 illustrates in greater detail the phase shift discriminator and phase detector 84 employed in the FIG. 3 circuit. The signal from amplifier 52 is applied to the primary winding 172 of a transformer 174. The transformer secondary winding 176 is connected to a diode bridge indicated generally at 178 which comprises the usual four diodes 180, 182, 184 and 186. More specifically, one end of the transformer secondary winding 176 is connected via resistor 188 to the junction of diodes 180 and 186. The other end of the transformer secondary winding is connected by way of resistor 190 to the junction of diodes 182 and 184.

A resistor 192 and choke 194 are connected in series between ground and the junction of diodes 180 and 182. The resistor serves as a termination for a line from the oscillator 57; the choke provides isolation for signals from the amplifier 52. An R–C network indicated generally at 196 connected between amplifier 52 and the junction of diodes 180 and 182 provides a 90° phase shift at the reference frequency $f_c$. Thus the diode bridge 178, transformer 174 and network 196 operate together as a conventional discriminator which applies to a load resistor 204 an error signal indicative of the difference between the reference frequency and the output frequency of the amplifier 52. This signal serves for "coarse" frequency control in the control circuit 54 of FIG. 3.

At the same time, the signal from reference frequency oscillator 57 is applied to the junction of resistor 192 and choke 194. This signal operates the bridge in a phase detection mode of operation, which is effective when the frequency from the amplifier 52 is close to the reference frequency and thus the error signal from discriminator operation is relatively small. The relatively large error signal from the phase detector mode of operation provides "fine" frequency control bringing the output of the amplifier 52 into synchronism with the reference signal from the oscillator 57.

It will be seen from the foregoing that our sweep frequency generator accurately controls the swept signal over the entire frequency sweep. With this invention, a precisely controlled linear sweep limited only by the characteristics of the components is possible, as well as controlled sweeps which increase or decrease with some other function of time. A system calling for a sweep up to 30 mc. is currently in operation. Moreover, close control of the sweep is achieved without undue complication of the circuitry as compared with prior systems.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of scope of the invention which, as a matter of language, might be said to fall therebetween.

Having described our invention, what we claim as new and desire to secure by Letters Patent is:

1. A controlled sweep frequency generator for providing an output whose frequency varies as a selected function of time, said generator comprising A. a variable frequency generator,
B. means for repetitively sampling the phase of the output signal from said variable frequency generator to develop error signals whose magnitude and polarity correspond to the difference between said phase and the phase of a reference signal,
C. a sampling frequency generator for controlling the sampling rate of said sampling means, said sampling frequency generator having a frequency such that when the output signal from said variable frequency generator changes frequency as said function of time, the phase of said output signal changes by predetermined increments between successive samplings by said sampling means, and
D. means for correcting the frequency of said variable frequency generator by applying to said variable frequency generator a correction signal in response to said error signal so as to make the variation of said frequency conform substantially to said function of time.

2. A controlled sweep frequency generator as defined in claim 1 wherein said sampling frequency generator has a frequency such that so long as said output signal from said variable frequency generator changes as said given function of time, an integral number of cycles of said output signal falls between successive samplings.

3. A controlled sweep frequency generator as defined in claim 1 wherein said correction signal includes slope, phase and frequency correction components.

4. A controlled sweep frequency generator as defined in claim 1 and further including a waveform generator for applying a time-varying voltage to said variable frequency generator so as to cause said frequency to vary approximately as said function of time, said controlling means controlling said variable frequency generator to correct deviations in the variation of said frequency from said selected time function.

5. A controlled sweep frequency generator as defined in claim 4 wherein said phase changes by equal increments between samplings.

6. A controlled sweep frequency generator as defined in claim 4 wherein
  A. the sampling frequency generator has a constant output frequency, and
  B. said function of time is a power of time.

7. A controlled sweep frequency generator as defined in claim 6 wherein said function of time is linear.

8. A controlled sweep frequency generator as defined in claim 4 wherein said samplings occur at zero axis crossings of said output signal from said variable frequency generator when said output signal varies as said function of time.

9. A controlled sweep frequency generator as defined in claim 4 and further including
  A. a reference oscillator, and
  B. means for synchronizing the output of said variable frequency generator to the output of said reference oscillator prior to the beginning of the frequency sweep.

10. A controlled sweep frequency generator as defined in claim 9 wherein the frequency of said sampling frequency generator is an integral submultiple of the frequency of said reference oscillator.

11. A controlled sweep frequency generator for providing an output whose frequency sweeps as a selected function of time, said generator comprising
  A. a variable frequency generator,
  B. a waveform generator for applying a control voltage to said variable frequency generator so as to cause said frequency to sweep approximately as said function of time,
  C. means for repetitively sampling the phase of the output signal from said variable frequency generator to develop error signals whose magnitude and polarity correspond to the difference between said phase and the phase of a reference signal,
  D. a sampling frequency generator for controlling the sampling rate of said sampling means, said sampling frequency generator having a frequency such that when the output from said variable frequency generator sweeps frequency as said function of time, the phase of said output signal changes by equal increments between samplings, and
  E. a correction circuit for correcting the frequency of said variable frequency generator by applying a correction signal thereto in response to said error signals so as to make said frequency sweep in substantial conformity with said function of time, said correction circuit including means for producing a continuous output voltage whose level changes in correspondence with said error signals, said voltage levels being frequency correction components in said correction signal.

12. A controlled sweep frequency generator as defined in claim 11 wherein said correction circuit also includes means for generating a time-varying voltage during each sampling whose time variation is proportional to the sum of said error signals from said sampling means during said frequency sweep, said time-varying voltage being a slope correction component in said correction signal.

13. A controlled sweep frequency generator as defined in claim 11 including means for coupling to said variable frequency generator during each sampling a pulse proportional to the phase error in said frequency sweep, said pulse being a phase correction component in said correction signal.

14. A linear sweep frequency generator whose frequency sweeps over a selected range comprising
  A. a variable frequency generator.
  B. a waveform generator for applying a time-varying voltage to said variable frequency generator so as to cause said frequency to sweep approximately linearly,
  C. means for repetitively sampling the phase of the output signal from said variable frequency generator to develop error signals whose magnitude and polarity correspond to the difference between said phase and the phase of a reference signal,
  D. a sampling frequency generator for controlling the sampling rate of said sampling means, said sampling frequency generator having a frequency such that when the frequency of the output signal from said variable frequency generator changes linearly, the phase of said output signal changes by equal increments between samplings, and
  E. a correction circuit responsive to said error signals for correcting the frequency of said variable frequency oscillator by applying thereto a correction signal so as to make the frequency of said oscillator sweep linearly, said correction circuit including
    (1) means for producing a continuous output voltage whose level changes in correspondence with successive error signals during successive samplings by said sampling means, said voltage levels being frequency correction components in said correction signal,
    (2) means for generating a ramp voltage during each said sampling whose slope is proportional to the sum of said error signals from said sampling means, said ramp voltages being slope correction components in said correction signal,
    (3) means for coupling to said variable frequency generator during each sampling a pulse proportional to the phase error in said output signal, said pulses being phase correction components in said correction signal.

15. A linear sweep frequency generator as defined in claim 14 and further including
  A. means for removing said correction signal from said correction circuit and resetting said variable frequency generator when the frequency of said output signal reaches the end of said range.

16. A controlled sweep frequency generator for providing an output ingnal whose frequency sweeps as a selected function of time, said generator comprising
  A. a variable frequency generator,
  B. means for controlling said variable frequency generator so that it sweeps frequency approximately as said selected function of time,
  C. means for repetitively sampling the phase of the output signal from said variable frequency generator to develop error signals whose magnitude and polarity correspond to the difference between said phase and the phase of a reference signal,
  D. a sampling frequency generator for controlling the sampling rate of said sampling means, said sampling frequency generator having a frequency such that when the output signal from said variable frequency generator sweeps frequency as said function of time, the phase of said output signal changes by predetermined increments between successive samplings by said sampling means,
  E. a correction circuit responsive to said error signals for correcting the frequency of said variable frequency generator by applying thereto a correction signal to make the variation of said frequency conform substantially to said function of time,
  F. a reference oscillator whose signal frequency is an integral multiple of the frequency of said sampling frequency generator, and
  G. a phase lock circuit connected to develop a control voltage synchronizing the output of said variable frequency generator to the output of said reference oscillator prior to the beginning of said frequency sweep.

17. A controlled sweep frequency generator as defined in claim 16 wherein said phase lock circuit holds its said control voltage during said frequency sweep.

18. A controlled sweep frequency generator as defined in claim 16 and further including means for offsetting the frequency of said variable frequency generator from that of said reference oscillator at the beginning of said frequency sweep so as to adjust the phase of said swept signal by a predetermined amount.

19. A linear sweep frequency generator which sweeps over a selected frequency range, said generator comprising
A. a variable frequency generator,
B. a waveform generator for applying a ramp voltage to said variable frequency generator so as to cause said frequency to sweep linearly,
C. means for repetitively sampling the phase of the output signal from said variable frequency generator to develop error signals whose magnitude and polarity correspond to the difference between said phase and the phase of a reference signal,
D. a sampling frequency generator for controlling the sampling rate of said sampling means, said sampling frequency generator having a frequency such that when the output signal from said variable frequency generator sweeps frequency linearly, the phase of said output signal changes by an integral number of cycles between samplings,
E. a correction circuit for correcting the frequency of said variable frequency generator by applying a correction signal thereto in response to said error signals so as to make said frequency sweep substantially linearly,
F. a reference oscillator whose frequency is an integral multiple of said frequency of said sampling frequency generator,
G. a timing network,
H. means responsive to a first signal from said timing network for resetting said variable frequency oscillator frequency to the beginning of said frequency range after the swept signal reaches the end of its said range,
I. means responsive to a second signal from said timing network for removing said correction signal from said correction circuit prior to the beginning of the frequency sweep,
J. a constant frequency control circuit responsive to a third signal from said timing network for synchronizing the initial output of said variable frequency generator to the output of said reference oscillator prior to the beginning of the frequency sweep by developing error signals proportional to the phase difference between said output signal from said variable frequency generator and said reference oscillator output, said timing network also controlling said waveform generator so as to commence the frequency sweep after the output of said variable frequency generator has been synchronized to the output of said reference oscillator.

20. A linear sweep frequency generator whose frequency sweeps over a selected frequency range comprising
A. a variable frequency generator,
B. a waveform generator for applying a time-varying voltage to said variable frequency generator so as to cause said frequency to sweep approximately linearly,
C. means for repetitively sampling the phase of the output signal from said variable frequency generator to develop error signals whose magnitude and polarity correspond to the difference between said phase and the phase of a reference signal,
D. a sampling frequency generator for controlling the sampling rate of said sampling means, said sampling frequency generator having a frequency such that when the frequency of the output signal from said variable frequency generator changes linearly, the phase of said output signal changes by an integral number of cycles between samplings,
E. a correction circuit responsive to said error signals for correcting the frequency of said variable frequency generator by applying thereto a correction signal so as to make the frequency of said variable frequency generator sweep substantially linearly, said correction circuit including
  (1) means for producing a continuous output voltage whose level changes in correspondence with successive error signals, said voltage level being a frequency correction component in said correction signal,
  (2) means for generating a ramp voltage during each said sampling whose slope is proportional to the sum of said error signals from said sampling means during the frequency sweep, said ramp voltage being a slope correction component in said correction signal,
  (3) means for coupling to said variable frequency generator during each sampling a pulse proportional to the phase error in said frequency sweep, said pulse being a phase correction component in said correction signal,
F. a reference oscillator whose signal frequency is an integral multiple of said sampling frequency generator frequency,
G. a timing network,
H. means responsive to a first signal from said timing network for resetting the frequency of said oscillator to the beginning of said range after the swept signal reaches the end of its said range,
I. means responsive to a second signal from said timing network for removing said correction signal from said correction circuit prior to the beginning of the frequency sweep,
J. a phase lock circuit connected to a synchronize the initial output of said variable frequency generator to the output of said reference oscillator in response to a first signal from said timing network, said timing network also controlling said waveform generator so as to commence the frequency sweep after the output of said variable frequency generator has been synchronized to the frequency of said reference oscillator.

No references cited.

JOHN KOMINSKI, *Primary Examiner.*

UNITED STATES PATENT OFFICE
CERTIFICATE OF CORRECTION

Patent No. 3,382,460                                           May 7, 1968

Daniel Blitz et al.

It is certified that error appears in the above identified patent and that said Letters Patent are hereby corrected as shown below:

Column 3, equation (1), "$f_4$" should read -- $f_o$ --; equation (2), "$\theta+f_4 t$" should read -- $\theta_0+f_0 t$ --; line 39, "$\theta_4$" should read -- $\theta_0$ --; equation (4), "=", second occurrence, should read -- + --. Column 5, equation (21), "...]" should read -- —..] --; equation (24), "$\Delta\delta$" should read -- $\Delta\theta$ --. Column 7, line 49, "conected" should read -- connected --. Column 11, line 15, simplified" should read -- amplified --. Column 14, line 43, "ingnal" should read -- signal --.

Signed and sealed this 18th day of November 1969.

(SEAL)
Attest:

EDWARD M. FLETCHER, JR.                           WILLIAM E. SCHUYLER, JR.
Attesting Officer                                         Commissioner of Patents